United States Patent
Elshafie et al.

(10) Patent No.: US 12,245,027 B2
(45) Date of Patent: Mar. 4, 2025

(54) PHYSICAL UPLINK CHANNEL HANDLING BASED ON CHANNEL SECURITY

(71) Applicant: QUALCOMM Incorporated, San Diego, CA (US)

(72) Inventors: Ahmed Elshafie, San Diego, CA (US); Hung Dinh Ly, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 589 days.

(21) Appl. No.: 17/448,498

(22) Filed: Sep. 22, 2021

(65) Prior Publication Data

US 2023/0089923 A1    Mar. 23, 2023

(51) Int. Cl.
*H04W 12/037* (2021.01)
*H04L 5/00* (2006.01)
(Continued)

(52) U.S. Cl.
CPC ......... *H04W 12/037* (2021.01); *H04L 5/0053* (2013.01); *H04L 5/0058* (2013.01);
(Continued)

(58) Field of Classification Search
CPC ................. H04L 5/0053; H04L 5/0058; H04L 63/105; H04L 9/0819; H04W 12/037; H04W 12/0431; H04W 12/60; H04W 12/67; H04W 72/02; H04W 72/1268; H04W 72/563
See application file for complete search history.

(56) References Cited

U.S. PATENT DOCUMENTS 7,061,929 B1 * 6/2006 Eberle ................... H04L 47/125
                                                370/423
11,006,397 B2 * 5/2021 Xiong ................... H04L 1/0026
(Continued)

FOREIGN PATENT DOCUMENTS

WO   WO-2020033941 A1   2/2020
WO   WO-2020164475 A1   8/2020

OTHER PUBLICATIONS

3GPP TS 33.220: "3rd Generation Partnership Project, Technical Specification Group Services and System Aspects, Generic Authentication Architecture (GAA), Generic Bootstrapping Architecture (GBA) (Release 17)", 3rd Generation Partnership Project, Technical Specification Group Services and System Aspects, V17.1.0, Jun. 25, 2021, XP052029773, pp. 1-95, cited in the application Annex B (normative): Specification of the key derivation function KDF, p. 40-p. 44.
(Continued)

Primary Examiner — Sharon S Lynch
(74) Attorney, Agent, or Firm — Harrity & Harrity, LLP

(57) ABSTRACT

Various aspects of the present disclosure generally relate to wireless communication. In some aspects, a user equipment (UE) may identify a set of security levels for a set of physical uplink channels, wherein the set of physical uplink channels are overlapping in time. The UE may transmit one or more of the set of physical uplink channels based at least in part on the set of security levels for the set of physical uplink channels. Numerous other aspects are described.

30 Claims, 10 Drawing Sheets

800 ⟶

| Channel | Priority | Security | Key (seq) |
|---|---|---|---|
| A | 1 | 2 | sk1 |
| B | 1 | 3 | sk2 |
| C | 2 | 1 | sk3 (abcd) |
| D | 3 | 1 | sk4 (efgh) |

810
Identify security levels for physical uplink channels

120

820
Transmit one or more physical uplink channels ⟶

110

(51) Int. Cl.
H04L 9/08 (2006.01)
H04L 9/40 (2022.01)
H04W 12/0431 (2021.01)

(52) U.S. Cl.
CPC .......... H04L 9/0819 (2013.01); H04L 63/105 (2013.01); H04W 12/0431 (2021.01)

(56) References Cited

U.S. PATENT DOCUMENTS

| | | | | |
|---|---|---|---|---|
| 11,013,028 | B2* | 5/2021 | Babaei | H04W 72/23 |
| 11,064,514 | B2* | 7/2021 | Hosseini | H04W 72/21 |
| 11,122,622 | B2* | 9/2021 | Hosseini | H04L 1/1812 |
| 11,528,731 | B2* | 12/2022 | Li | H04L 1/1896 |
| 11,606,814 | B2* | 3/2023 | Hosseini | H04L 1/1812 |
| 11,812,304 | B2* | 11/2023 | Huang | H04W 28/10 |
| 11,863,665 | B2* | 1/2024 | Kunz | H04L 9/0833 |
| 2012/0127925 | A1* | 5/2012 | Kim | H04W 48/16 370/328 |
| 2015/0382279 | A1* | 12/2015 | Zhao | H04W 76/15 370/225 |
| 2018/0316661 | A1* | 11/2018 | Teixeron | H04L 63/0838 |
| 2019/0021115 | A1* | 1/2019 | Gupta | H04W 72/1215 |
| 2019/0098566 | A1* | 3/2019 | Li | H04W 88/06 |
| 2019/0149365 | A1* | 5/2019 | Chatterjee | H04L 25/0226 370/329 |
| 2019/0261361 | A1* | 8/2019 | Xiong | H04W 72/02 |
| 2019/0281588 | A1* | 9/2019 | Zhang | H04B 7/0617 |
| 2020/0045730 | A1* | 2/2020 | Babaei | H04W 72/23 |
| 2020/0053761 | A1* | 2/2020 | Hosseini | H04W 72/21 |
| 2020/0260517 | A1* | 8/2020 | Huang | H04W 76/14 |
| 2020/0314900 | A1* | 10/2020 | Hosseini | H04W 74/0858 |
| 2021/0051005 | A1* | 2/2021 | Kunz | H04W 12/04 |
| 2021/0058952 | A1* | 2/2021 | Li | H04W 72/1268 |
| 2021/0194740 | A1* | 6/2021 | Aldana | H04W 72/1268 |
| 2021/0203397 | A1* | 7/2021 | Xiong | H04W 72/046 |
| 2021/0336874 | A1* | 10/2021 | Huang | H04L 45/245 |
| 2021/0360650 | A1* | 11/2021 | Huang | H04W 72/21 |
| 2021/0368571 | A1* | 11/2021 | Huang | H04W 76/16 |
| 2021/0377803 | A1* | 12/2021 | Huang | H04W 28/0925 |
| 2022/0124756 | A1* | 4/2022 | Taherzadeh Boroujeni | H04W 72/23 |
| 2022/0141775 | A1* | 5/2022 | Lu | H04W 72/23 370/318 |
| 2022/0159777 | A1* | 5/2022 | Lin | H04W 76/36 |
| 2022/0345883 | A1* | 10/2022 | Wu | H04W 36/0038 |
| 2022/0394740 | A1* | 12/2022 | Choi | H04L 1/1854 |
| 2023/0007483 | A1* | 1/2023 | Mueck | G06Q 50/265 |
| 2023/0022915 | A1* | 1/2023 | Bhamri | H04B 7/0408 |
| 2024/0147471 | A1* | 5/2024 | Islam | H04W 72/232 |

OTHER PUBLICATIONS

International Search Report and Written Opinion—PCT/US2022/075275—ISA/EPO—Dec. 1, 2022.

* cited by examiner

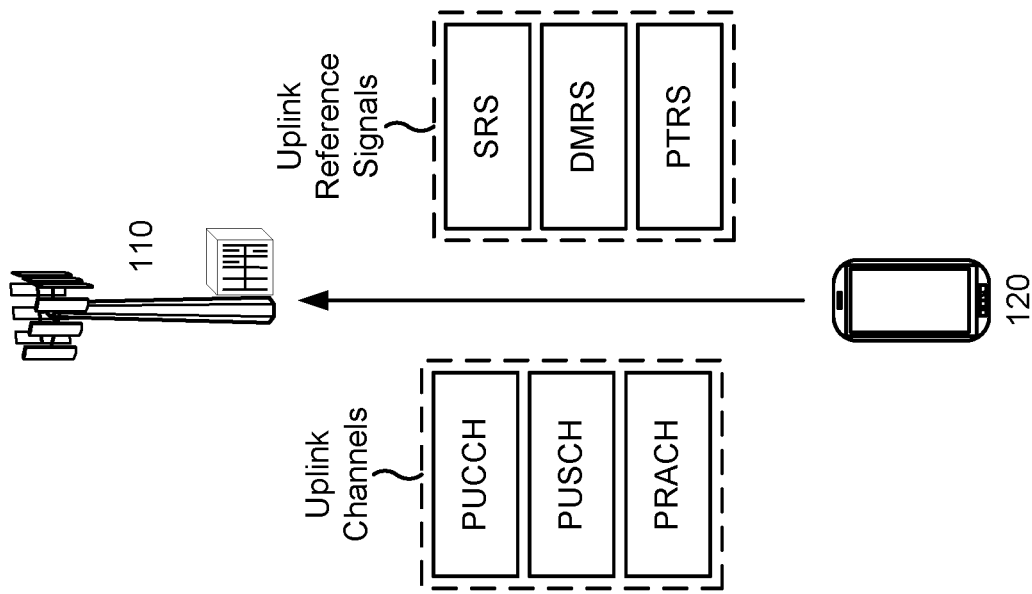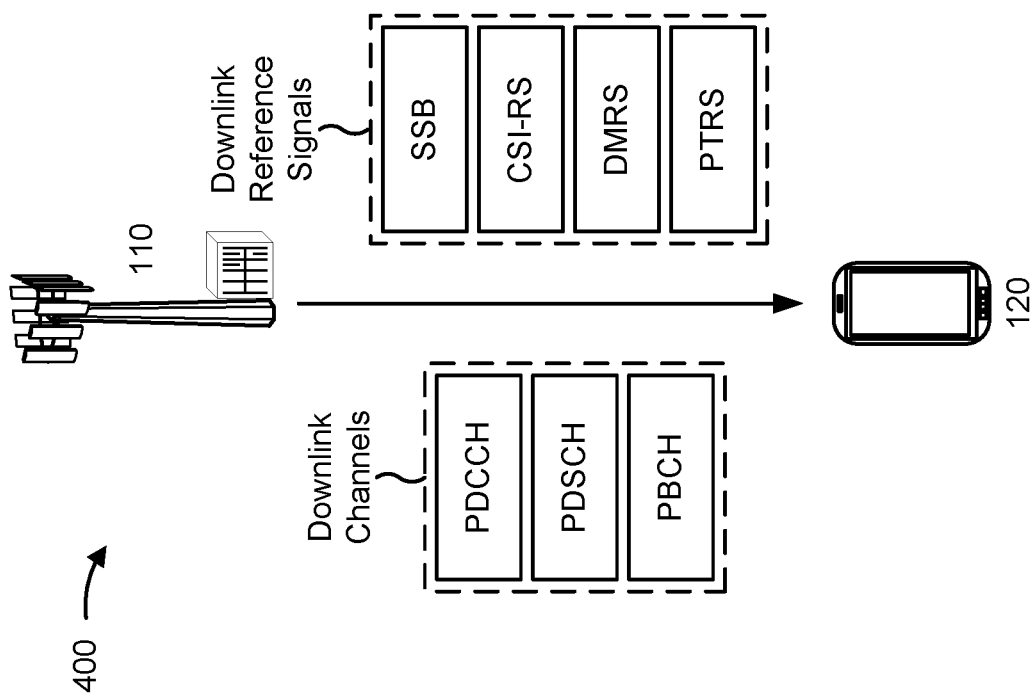
FIG. 4

PHYSICAL UPLINK CHANNEL HANDLING BASED ON CHANNEL SECURITY

FIELD OF THE DISCLOSURE

Aspects of the present disclosure generally relate to wireless communication and to techniques and apparatuses for physical uplink channel handling based on channel security.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include identifying a set of security levels for a set of physical uplink channels, wherein the set of physical uplink channels are overlapping in time. The method may include transmitting one or more of the set of physical uplink channels based at least in part on the set of security levels for the set of physical uplink channels.

Some aspects described herein relate to a UE for wireless communication. The user equipment may include a memory and one or more processors coupled to the memory. The one or more processors may be configured to identify a set of security levels for a set of physical uplink channels, wherein the set of physical uplink channels are overlapping in time. The one or more processors may be configured to transmit one or more of the set of physical uplink channels based at least in part on the set of security levels for the set of physical uplink channels.

Some aspects described herein relate to a non-transitory computer-readable medium that stores a set of instructions for wireless communication by a UE. The set of instructions, when executed by one or more processors of the UE, may cause the UE to identify a set of security levels for a set of physical uplink channels, wherein the set of physical uplink channels are overlapping in time. The set of instructions, when executed by one or more processors of the UE, may cause the UE to transmit one or more of the set of physical uplink channels based at least in part on the set of security levels for the set of physical uplink channels.

Some aspects described herein relate to an apparatus for wireless communication. The apparatus may include means for identifying a set of security levels for a set of physical uplink channels, wherein the set of physical uplink channels are overlapping in time. The apparatus may include means for transmitting one or more of the set of physical uplink channels based at least in part on the set of security levels for the set of physical uplink channels.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of physical channels and reference signals in a wireless network, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
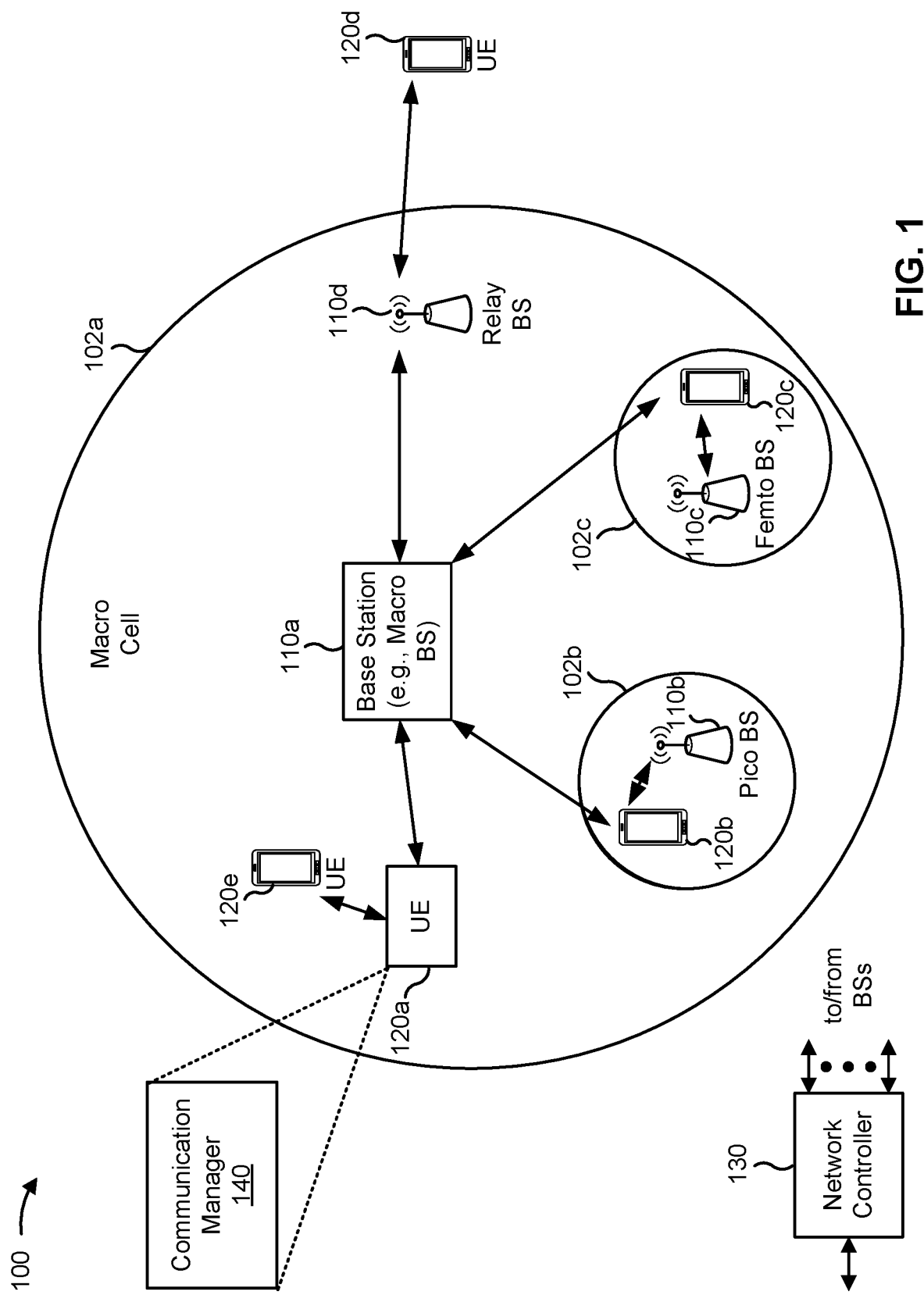
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may identify a set of security levels for a set of physical uplink channels, wherein the set of physical uplink channels are overlapping in time; and transmit one or more of the set of physical uplink channels based at least in part on the set of security levels for the set of physical uplink channels. Additionally, or alternatively, the communication manager 140 may perform one or more other operations described herein.

As indicated above, FIG. 1 is provided as an example. Other examples may differ from what is described with regard to FIG. 1.

Figure 2:
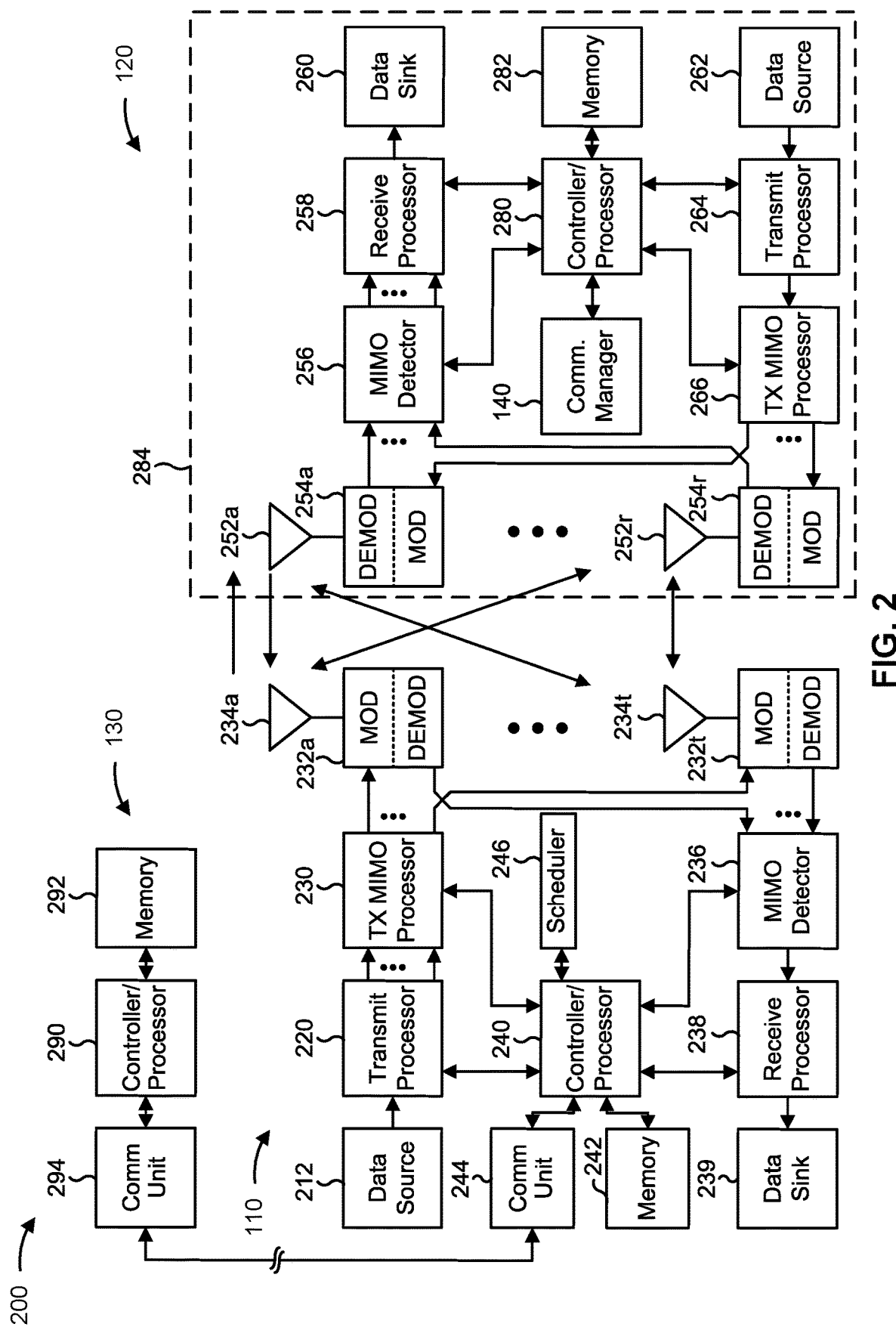
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with physical uplink channel handling based on channel security, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9 and/or other processes as described herein. In some examples, executing instructions may include running the instructions, converting the instructions, compiling the instructions, and/or interpreting the instructions, among other examples.

In some aspects, the UE 120 includes means for identifying a set of security levels for a set of physical uplink channels, wherein the set of physical uplink channels are overlapping in time; and/or means for transmitting one or more of the set of physical uplink channels based at least in part on the set of security levels for the set of physical uplink channels. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
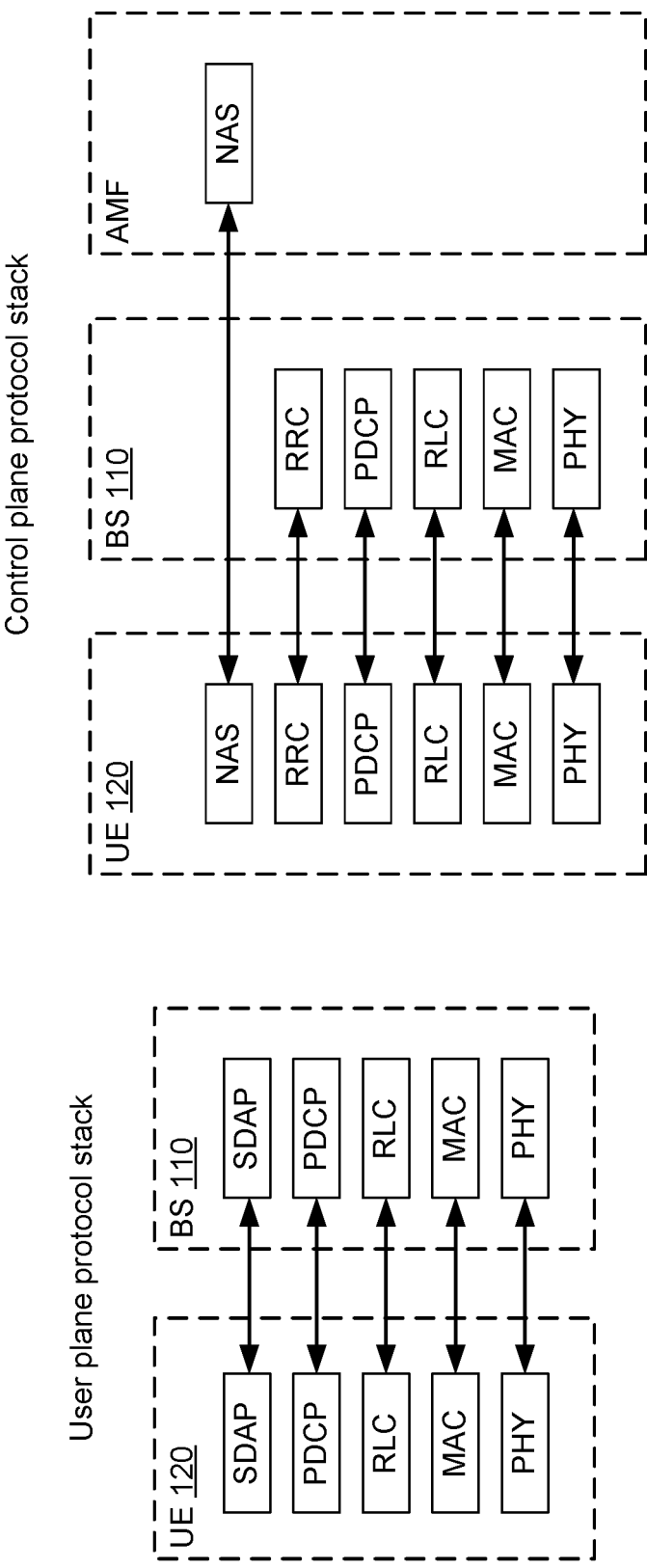
FIG. 3 is a diagram illustrating an example of a user plane protocol stack and a control plane protocol stack for a base station and a core network in communication with a UE, in accordance with the present disclosure.

FIG. 3 is a diagram illustrating an example 300 of a user plane protocol stack and a control plane protocol stack for a base station 110 and a core network in communication with a UE 120, in accordance with the present disclosure.

On the user plane, the UE 120 and the base station 110 may include respective physical (PHY) layers, medium access control (MAC) layers, radio link control (RLC) layers, packet data convergence protocol (PDCP) layers, and service data adaptation protocol (SDAP) layers. A user plane function may handle transport of user data between the UE 120 and the base station 110. On the control plane, the UE 120 and the base station 110 may include respective radio resource control (RRC) layers. Furthermore, the UE 120 may include a non-access stratum (NAS) layer in communication with an NAS layer of an access and management mobility function (AMF). The AMF may be associated with a core network associated with the base station 110, such as a 5G core network (5GC) or a next-generation radio access network (NG-RAN). A control plane function may handle transport of control information between the UE and the core network. Generally, a first layer is referred to as higher than a second layer if the first layer is further from the PHY layer than the second layer. For example, the PHY layer may be referred to as a lowest layer, and the SDAP/PDCP/RLC/MAC layer may be referred to as higher than the PHY layer and lower than the RRC layer. An application (APP) layer, not shown in FIG. 3, may be higher than the SDAP/PDCP/RLC/MAC layer. In some cases, an entity may handle the services and functions of a given layer (e.g., a PDCP entity may handle the services and functions of the PDCP layer), though the description herein refers to the layers themselves as handling the services and functions.

The RRC layer may handle communications related to configuring and operating the UE 120, such as: broadcast of system information related to the access stratum (AS) and the NAS; paging initiated by the 5GC or the NG-RAN; establishment, maintenance, and release of an RRC connection between the UE and the NG-RAN, including addition, modification, and release of carrier aggregation, as well as addition, modification, and release of dual connectivity; security functions including key management; establishment, configuration, maintenance, and release of signaling radio bearers (SRBs) and data radio bearers (DRBs); mobility functions (e.g., handover and context transfer, UE cell selection and reselection and control of cell selection and reselection, inter-RAT mobility); quality of service (QoS) management functions; UE measurement reporting and control of the reporting; detection of and recovery from radio link failure; and NAS message transfer between the NAS layer and the lower layers of the UE 120. The RRC layer is frequently referred to as Layer 3 (L3). In some wireless systems, information is encrypted at L3 and information generated below L3 is not encrypted.

The SDAP layer, PDCP layer, RLC layer, and MAC layer may be collectively referred to as Layer 2 (L2). Thus, in some cases, the SDAP, PDCP, RLC, and MAC layers are referred to as sublayers of Layer 2. On the transmitting side (e.g., if the UE 120 is transmitting an uplink communication or the base station 110 is transmitting a downlink communication), the SDAP layer may receive a data flow in the form of a QoS flow. A QoS flow is associated with a QoS identifier, which identifies a QoS parameter associated with the QoS flow, and a QoS flow identifier (QFI), which identifies the QoS flow. Policy and charging parameters are enforced at the QoS flow granularity. A QoS flow can include one or more service data flows (SDFs), so long as each SDF of a QoS flow is associated with the same policy and charging parameters. In some aspects, the RRC/NAS layer may generate control information to be transmitted and may map the control information to one or more radio bearers for provision to the PDCP layer.

The SDAP layer, or the RRC/NAS layer, may map QoS flows or control information to radio bearers. Thus, the SDAP layer may be said to handle QoS flows on the transmitting side. The SDAP layer may provide the QoS flows to the PDCP layer via the corresponding radio bearers. The PDCP layer may map radio bearers to RLC channels. The PDCP layer may handle various services and functions on the user plane, including sequence numbering, header compression and decompression (if robust header compression is enabled), transfer of user data, reordering and duplicate detection (if in-order delivery to layers above the PDCP layer is required), PDCP protocol data unit (PDU) routing (in case of split bearers), retransmission of PDCP service data units (SDUs), ciphering and deciphering, PDCP SDU discard (e.g., in accordance with a timer, as described elsewhere herein), PDCP re-establishment and data recovery for RLC acknowledged mode (AM), and duplication of PDCP PDUs. The PDCP layer may handle similar services and functions on the control plane, including sequence numbering, ciphering, deciphering, integrity protection, transfer of control plane data, duplicate detection, and duplication of PDCP PDUs.

The PDCP layer may provide data, in the form of PDCP PDUs, to the RLC layer via RLC channels. The RLC layer may handle transfer of upper layer PDUs to the MAC and/or PHY layers, sequence numbering independent of PDCP sequence numbering, error correction via automatic repeat requests (ARQ), segmentation and re-segmentation, reassembly of an SDU, RLC SDU discard, and RLC re-establishment.

The RLC layer may provide data, mapped to logical channels, to the MAC layer. The services and functions of the MAC layer include mapping between logical channels and transport channels (used by the PHY layer as described below), multiplexing/demultiplexing of MAC SDUs belonging to one or different logical channels into/from transport blocks (TBs) delivered to/from the physical layer on transport channels, scheduling information reporting, error correction through hybrid ARQ (HARQ), priority handling between UEs by means of dynamic scheduling, priority handling between logical channels of one UE by means of logical channel prioritization, and padding.

The MAC layer may package data from logical channels into TBs, and may provide the TBs on one or more transport channels to the PHY layer. The PHY layer may handle various operations relating to transmission of a data signal, as described in more detail in connection with FIG. 2. The PHY layer is frequently referred to as Layer 1 (L1). To encrypt information at L1, a UE 120 or base station 110 may use a secret key generated based at least in part on a key provided to the PHY layer from an upper layer and/or based at least in part on one or more PHY layer parameters. Using the one or more PHY layer parameters may provide some randomness between the transmitter and the receiver. Alternatively, another source of randomness may be used in connection with transmitted information. Using randomness may reduce an effectiveness of attempts to intercept communications by an intercepting (e.g., eavesdropping) communication device On the receiving side (e.g., if the UE 120 is receiving a downlink communication or the base station 110 is receiving an uplink communication), the operations may be similar to those described for the transmitting side, but reversed. For example, the PHY layer may receive TBs and may provide the TBs on one or more transport channels to the MAC layer. The MAC layer may map the transport channels to logical channels and may provide data to the RLC layer via the logical channels. The RLC layer may map the logical channels to RLC channels and may provide data to the PDCP layer via the RLC channels. The PDCP layer may map the RLC channels to radio bearers and may provide data to the SDAP layer or the RRC/NAS layer via the radio bearers.

Data may be passed between the layers in the form of PDUs and SDUs. An SDU is a unit of data that has been passed from a layer or sublayer to a lower layer. For example, the PDCP layer may receive a PDCP SDU. A given layer may then encapsulate the unit of data into a PDU and may pass the PDU to a lower layer. For example, the PDCP layer may encapsulate the PDCP SDU into a PDCP PDU and may pass the PDCP PDU to the RLC layer. The RLC layer may receive the PDCP PDU as an RLC SDU, may encapsulate the RLC SDU into an RLC PDU, and so on. In effect, the PDU carries the SDU as a payload.

As indicated above, FIG. 3 is provided as an example. Other examples may differ from what is described with regard to FIG. 3.

FIG. 4 is a diagram illustrating an example 400 of physical channels and reference signals in a wireless network, in accordance with the present disclosure. As shown in FIG. 4, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

Different physical uplink channels may have different security requirements. For example, a PUCCH that is conveying a HARQ-ACK may have a higher level of security than a PUCCH that is conveying a channel state information (CSI) report. Similarly, different physical uplink channels may have different levels of priority, and the security requirements may correspond to the levels of priority. For example, a high priority PUCCH communication may have a relatively high security level requirement in comparison with a low priority PUCCH communication that may have a relatively low security level requirement.

As further shown, a downlink reference signal may include a synchronization signal block (SSB), a CSI reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 4 is provided as an example. Other examples may differ from what is described with regard to FIG. 4.

Figure 5:
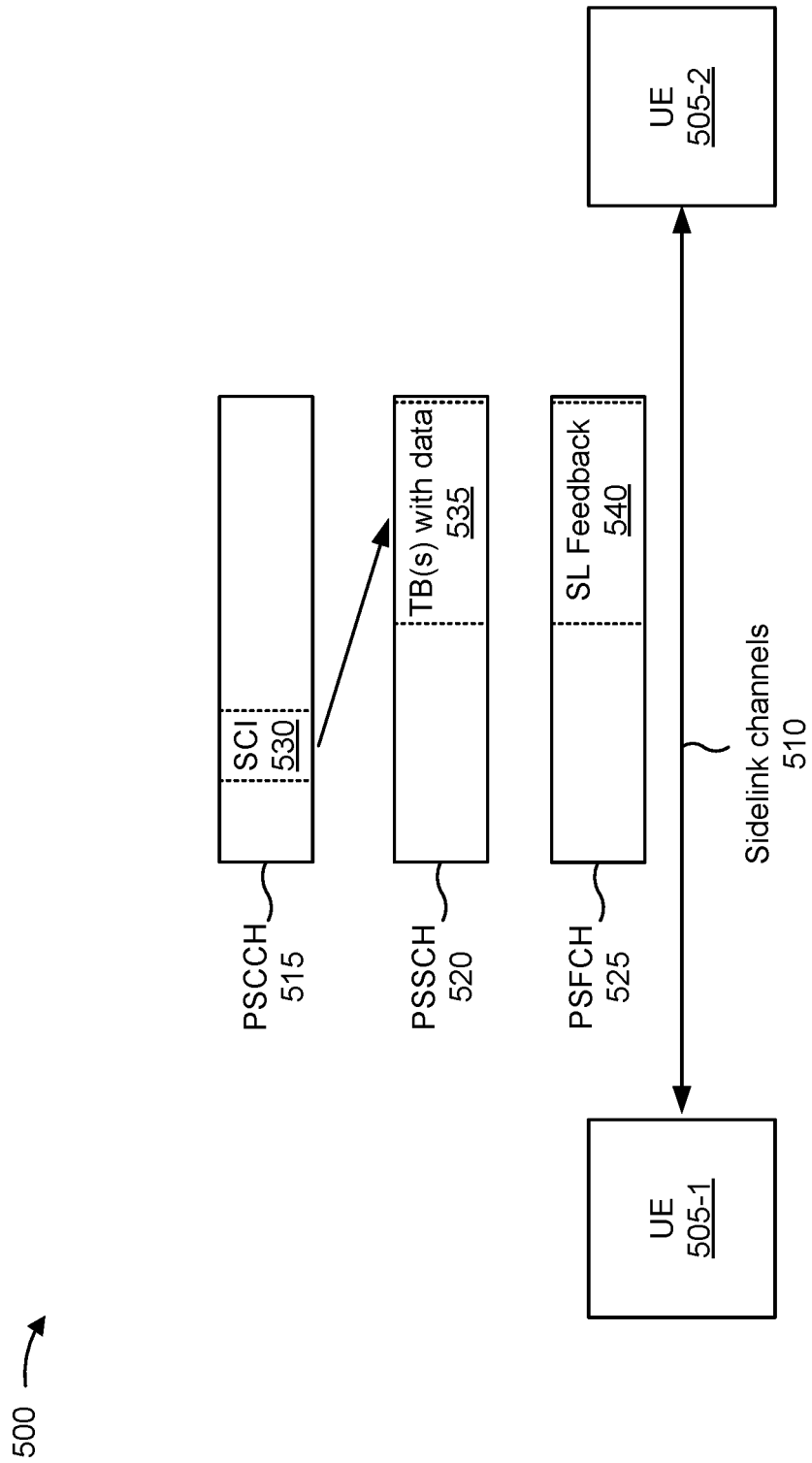
FIG. 5 is a diagram illustrating an example of sidelink communications, in accordance with the present disclosure.

FIG. 5 is a diagram illustrating an example 500 of sidelink communications, in accordance with the present disclosure.

As shown in FIG. 5, a first UE 505-1 may communicate with a second UE 505-2 (and one or more other UEs 505) via one or more sidelink channels 510. The UEs 505-1 and 505-2 may communicate using the one or more sidelink channels 510 for P2P communications, D2D communications, V2X communications (e.g., which may include V2V communications, V2I communications, and/or V2P communications) and/or mesh networking. In some aspects, the UEs 505 (e.g., UE 505-1 and/or UE 505-2) may correspond to one or more other UEs described elsewhere herein, such as UE 120. In some aspects, the one or more sidelink channels 510 may use a PC5 interface and/or may operate in a high frequency band (e.g., the 5.9 GHz band). Additionally, or alternatively, the UEs 505 may synchronize timing of transmission time intervals (TTIs) (e.g., frames, subframes, slots, or symbols) using global navigation satellite system (GNSS) timing.

As further shown in FIG. 5, the one or more sidelink channels 510 may include a physical sidelink control channel (PSCCH) 515, a physical sidelink shared channel (PSSCH) 520, and/or a physical sidelink feedback channel (PSFCH) 525. The PSCCH 515 may be used to communicate control information, similar to a PDCCH and/or a PUCCH used for cellular communications with a base station 110 via an access link or an access channel. The PSSCH 520 may be used to communicate data, similar to a PDSCH and/or a PUSCH used for cellular communications with a base station 110 via an access link or an access channel. For example, the PSCCH 515 may carry sidelink control information (SCI) 530, which may indicate various control information used for sidelink communications, such as one or more resources (e.g., time resources, frequency resources, and/or spatial resources) where a TB 535 may be carried on the PSSCH 520. The TB 535 may include data. The PSFCH 525 may be used to communicate sidelink feedback 540, such as HARQ feedback (e.g., ACK/NACK information), transmit power control (TPC), and/or a scheduling request (SR).

Although shown on the PSCCH 515, in some aspects, the SCI 530 may include multiple communications in different stages, such as a first stage SCI (SCI-1) and a second stage SCI (SCI-2). The SCI-1 may be transmitted on the PSCCH 515. The SCI-2 may be transmitted on the PSSCH 520. The SCI-1 may include, for example, an indication of one or more resources (e.g., time resources, frequency resources, and/or spatial resources) on the PSSCH 520, information for decoding sidelink communications on the PSSCH, a QoS priority value, a resource reservation period, a PSSCH DMRS pattern, an SCI format for the SCI-2, a beta offset for the SCI-2, a quantity of PSSCH DMRS ports, and/or a MCS. The SCI-2 may include information associated with data transmissions on the PSSCH 520, such as a HARQ process ID, a new data indicator (NDI), a source identifier, a destination identifier, and/or a CSI report trigger.

In some aspects, the one or more sidelink channels 510 may use resource pools. For example, a scheduling assignment (e.g., included in SCI 530) may be transmitted in sub-channels using specific resource blocks (RBs) across time. In some aspects, data transmissions (e.g., on the PSSCH 520) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 505 may operate using a transmission mode where resource selection and/or scheduling is performed by the UE 505 (e.g., rather than a base station 110). In some aspects, the UE 505 may perform resource selection and/or scheduling by sensing channel availability for transmissions. For example, the UE 505 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 505 may perform resource selection and/or scheduling using SCI 530 received in the PSCCH 515, which may indicate occupied resources and/or channel parameters. Additionally, or alternatively, the UE 505 may perform resource selection and/or scheduling by determining a channel busy rate (CBR) associated with various sidelink channels, which may be used for rate control (e.g., by indicating a maximum number of resource blocks that the UE 505 can use for a particular set of subframes).

In the transmission mode where resource selection and/or scheduling is performed by a UE 505, the UE 505 may generate sidelink grants, and may transmit the grants in SCI 530. A sidelink grant may indicate, for example, one or more parameters (e.g., transmission parameters) to be used for an upcoming sidelink transmission, such as one or more resource blocks to be used for the upcoming sidelink transmission on the PSSCH 520 (e.g., for TBs 535), one or more subframes to be used for the upcoming sidelink transmission, and/or an MCS to be used for the upcoming sidelink transmission. In some aspects, a UE 505 may generate a sidelink grant that indicates one or more parameters for semi-persistent scheduling (SPS), such as a periodicity of a sidelink transmission. Additionally, or alternatively, the UE 505 may generate a sidelink grant for event-driven scheduling, such as for an on-demand sidelink message.

As indicated above, FIG. 5 is provided as an example. Other examples may differ from what is described with respect to FIG. 5.

Figure 6:
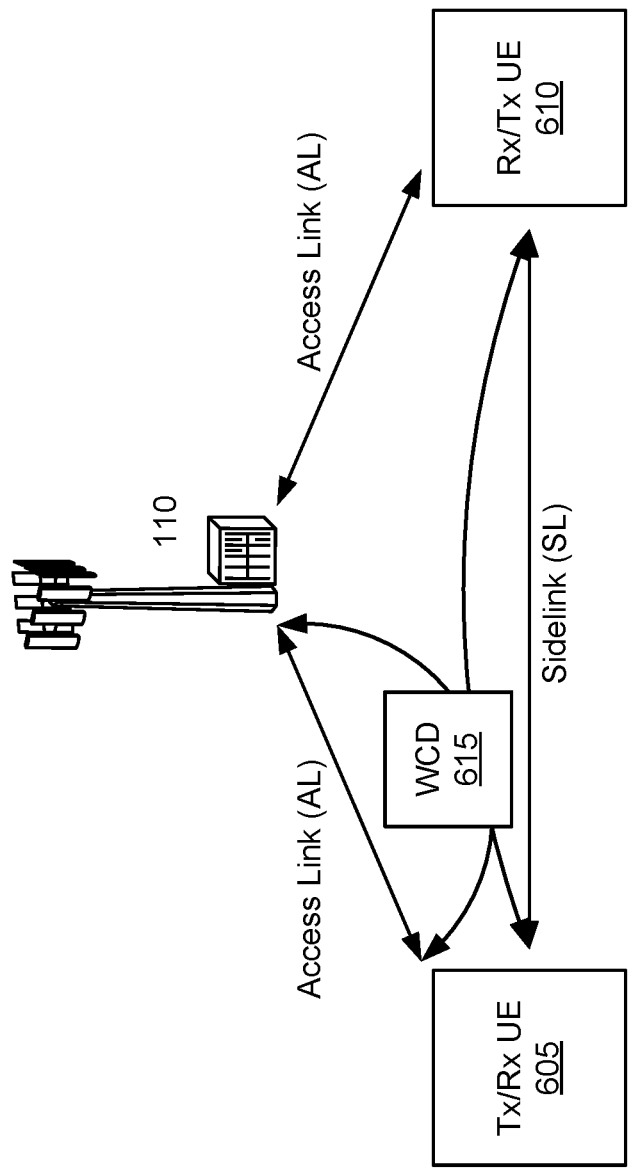
FIG. 6 is a diagram illustrating an example of sidelink communications and access link communications in the presence of an intercepting communication device, in accordance with the present disclosure.

FIG. 6 is a diagram illustrating an example 600 of sidelink communications and access link communications in the presence of an intercepting communication device, in accordance with the present disclosure.

As shown in FIG. 6, a transmitter (Tx)/receiver (Rx) UE 605 and an Rx/Tx UE 610 may communicate with one another via a sidelink, as described above in connection with FIG. 5. As further shown, in some sidelink modes, a base station 110 may communicate with the Tx/Rx UE 605 via a first access link. Additionally, or alternatively, in some sidelink modes, the base station 110 may communicate with the Rx/Tx UE 610 via a second access link. The Tx/Rx UE 605 and/or the Rx/Tx UE 610 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As further shown in FIG. 6, an intercepting wireless communication device 615 may be within a communication path between Tx/Rx UE 605 and Rx/Tx UE 610 or base station 110. In other words, intercepting wireless communication device 615 may eavesdrop on communications between Tx/Rx UE 605 and Rx/Tx UE 610 or between Tx/Rx UE 605 and base station 110. Although some aspects are described herein in terms of security handling for physical uplink channels, aspects described herein may apply to security handling for other types of channels or for sidelink channels, among other examples.

As indicated above, FIG. 6 is provided as an example. Other examples may differ from what is described with respect to FIG. 6.

Figure 7:
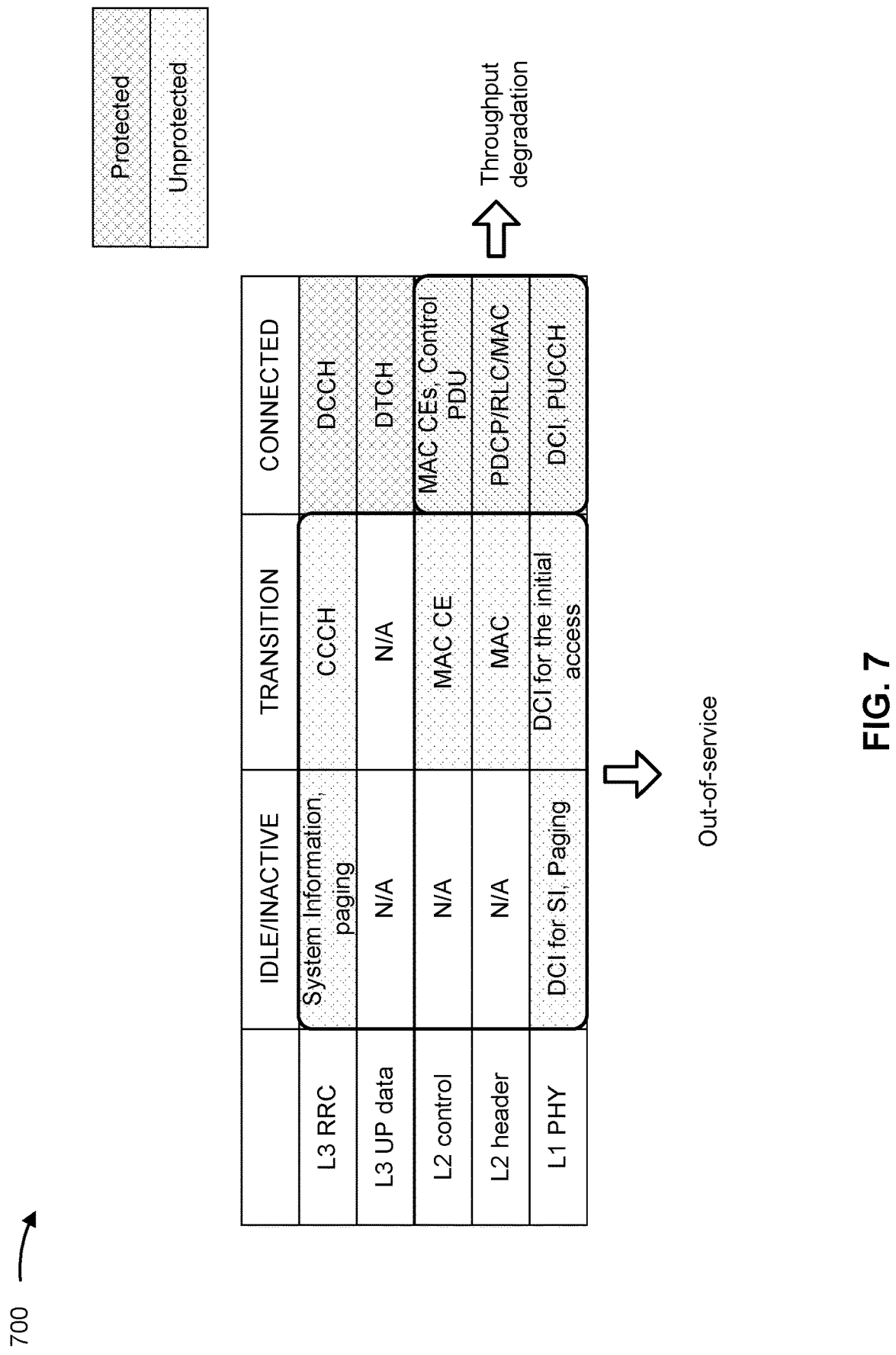
FIG. 7 is a diagram illustrating an example of intercepted communications in different communication states, in accordance with the present disclosure.

FIG. 7 is a diagram illustrating an example 700 of intercepted communications in different communication states, in accordance with the present disclosure.

A UE, such as the UE 120, may, when communicating with a base station, such as the base station 110, operate in one or more communication states. For example, the UE may operate in an idle or inactive mode or connected mode. Additionally, a transition mode may be defined when the UE is transitioning between the idle or inactive mode and the connected mode. The UE may facilitate secure communications with the base station (or when operating on a sidelink, with another UE) by encrypting data before transmission.

In some wireless communication systems, the UE may be configured to encrypt data at L3 (e.g., RRC data associated with a dedicated control channel (DCCH) or uplink data associated with a dedicated transport channel (DTCH)) when operating in a connected mode. Such data may be classified as protected by L3 level encryption. In contrast, the UE may not encrypt L3 system information or paging transmissions (e.g., when the UE is operating in an idle mode) and other DCCH transmissions (e.g., when the UE is transitioning between modes). Similarly, as shown, the UE may not encrypt L2 or L1 information (e.g., MAC CE data, MAC data, DCI, etc.) in the idle or inactive mode, the connected mode, or a transition mode therebetween. An intercepting wireless communication device may simulate operation of a base station, thereby gaining access to unencrypted L1 to L3 data and causing the UE to go out of service when the UE is operating in the idle or inactive mode or the transition mode. Similarly, the intercepting wireless communication device may gain access to unencrypted L2 to L1 data and cause degraded throughput when the UE is in a connected mode.

As indicated above, FIG. 7 is provided as an example. Other examples may differ from what is described with respect to FIG. 7.

As described above, to add encryption at a PHY layer, a UE may use a security key (which may be termed a "secret key" or a "key") and inject randomness into transmitted data. Additional detail regarding security keys is described in 3GPP Technical Specification (TS) 33.220, version 11.4.0, release 11. Different security keys may have different levels of security (e.g., robustness) and different communications may have different security requirements. A level of security of a security key may be based at least in part on a strength of a security key generation scheme (e.g., stronger security key generation scheme may result in a higher level of security of a security key). Additionally, or alternatively, the level of security of a security key may be based at least in part on a quantity of instances the security key has been used. In other words, the more a security key is used to encrypt data, the more likely it becomes that an intercepting wireless communication device may break the security key and gain access to data encrypted therewith.

Some UEs may use a multiplexing or dropping rule to manage overlapping resources between different channels. For example, when two PUCCH communications of different priorities fully or partially overlap, a UE may drop a low priority PUCCH communication, delay the low priority PUCCH communication, or multiplex the low priority PUCCH communication with a high priority PUCCH communication, among other examples. Similarly, when a PUSCH communication overlaps with a PUCCH communication, the UE may drop the PUCCH or multiplex the PUCCH and the PUSCH, among other examples. In this way, a UE may use relative priority to resolve collisions between different channels.

However, resolving collisions between different channels based only on priority may result in the UE transmitting an unsecure communication (e.g., a communication that is not encrypted or that is encrypted with less than a threshold level of security) rather than secure communication (e.g., a communication that is encrypted or that is encrypted with at least the threshold level of security). In this case, communication may be subject to an intercepting wireless communication device, which may cause poor communication performance.

Some aspects described herein enable security based channel handling. For example, a UE may prioritize a first physical uplink channel communication associated with a high security level over a second physical uplink channel associated with a low security level. In this way, the UE reduces a likelihood of the communication being negatively affected by a presence of an intercepting wireless communication device, thereby improving network performance. Furthermore, the UE may delay the second physical uplink channel associated with the low security level until, for example, a higher security level may be achieved for the second physical uplink channel (e.g., when another security key may be used or the UE may operate in a different mode), thereby improving information security for wireless communications.

Figure 8:
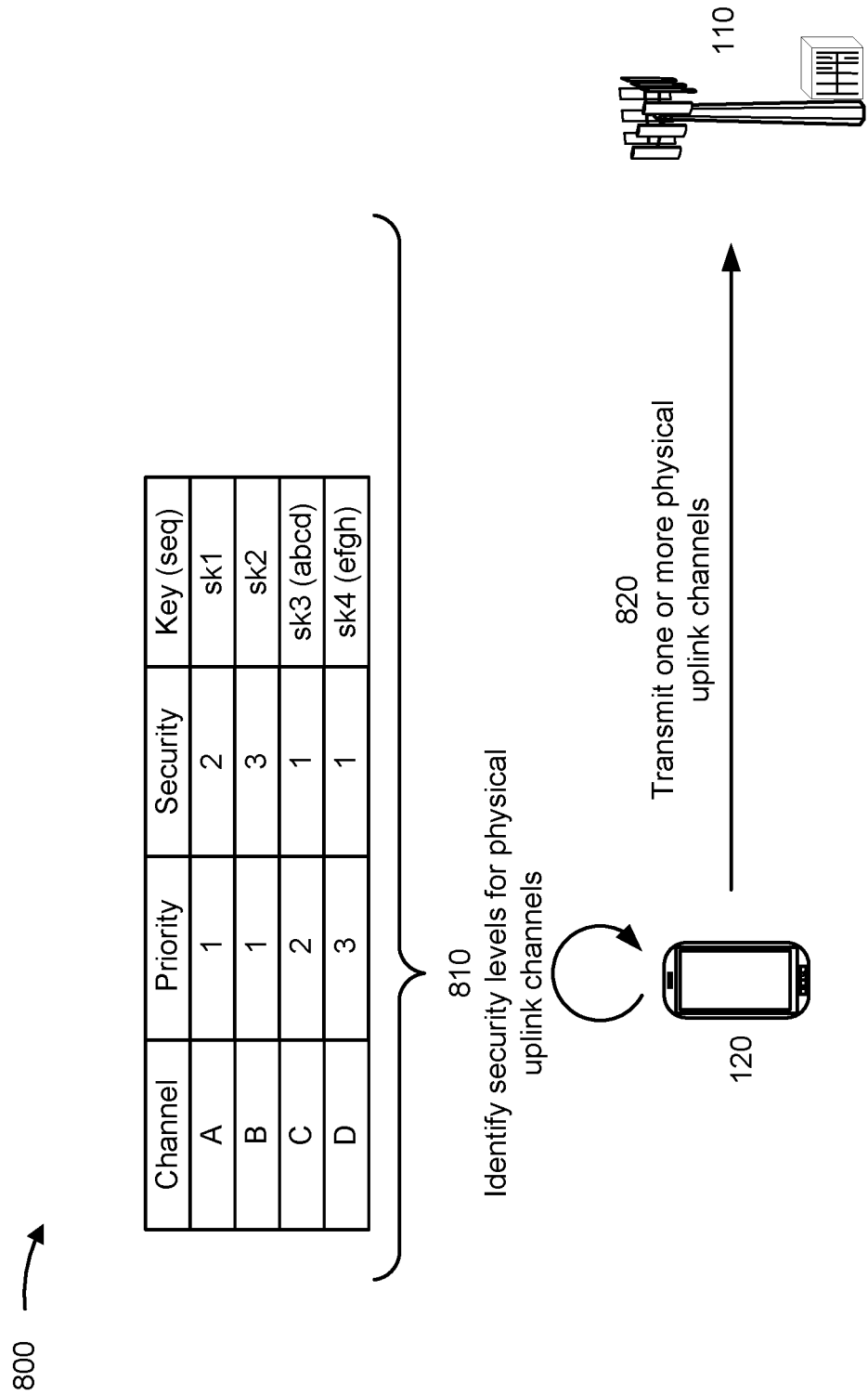
FIG. 8 is a diagram illustrating an example associated with physical uplink channel handling based on channel security, in accordance with the present disclosure.

FIG. 8 is a diagram illustrating an example 800 associated with physical uplink channel handling based on channel security, in accordance with the present disclosure. As shown in FIG. 8, example 800 includes communication between a base station 110 and a UE 120. In some aspects, base station 110 and UE 120 may be included in a wireless network, such as wireless network 100. Base station 110 and UE 120 may communicate via a wireless access link, which may include an uplink and a downlink.

As further shown in FIG. 8, and by reference number 810, UE 120 may identify a set of security levels for a set of physical uplink channels that are overlapping in time. For example, UE 120 may identify a first security level for a first physical uplink channel communication and a second security level for a second physical uplink channel communication.

In some aspects, UE 120 may determine a security level for a physical uplink channel based at least in part on a security level of a security key associated with the physical uplink channel. For example, UE 120 may determine a result of a security degradation function applied to the security key. A security degradation function may be, for example, applied each time a security is used or each time a time period ends, such that a security key degrades (e.g., is assigned a lower security level) over time. For example, a security degradation function may take a form of sk_dr=($\alpha$/t)+$\beta$, where sk_dr is a security level based on the security degradation function, $\alpha$ and $\beta$ are configurable constants (e.g., defined in a specification for UE 120, stored statically by UE 120, received in signaling from base station 110), and t is a time value (e.g., a quantity of instances in which the security key has been used for encryption, an amount of time periods that have elapsed). Additionally, or alternatively, UE 120 may determine the security level of the security key based at least in part on a timer. For example, UE 120 may assign a timer to a security key when the security key is generated and may derive the security level based at least in part on a value of the timer, whether the timer has expired, or a quantity of instances of expiration of the timer, among other examples.

In some aspects, UE 120 may determine respective security levels for security keys associated with the set of physical uplink channels. For example, UE 120 may determine that a first physical uplink channel communication has a low security level for a first security key and a second physical uplink channel communication has a high security level for a second security key. Additionally, or alternatively, UE 120 may determine that the first physical uplink channel communication has a low security level for the first security key and the second physical uplink channel communication has a low security level for the second security key. Additionally, or alternatively, UE 120 may determine that the first physical uplink channel communication has a high security level for the first security key and the second physical uplink channel communication has a low security level for the second security key. Additionally, or alternatively, UE 120 may determine that the first physical uplink channel communication has a high security level for the first security key and the second physical uplink channel communication has a high security level for the second security key. Although some aspects are described in terms of a particular quantity of channels, security keys, and/or security levels, other quantities of channels, security keys, and/or security levels are possible.

In some aspects, UE 120 may use a set order for evaluating a security level and a priority level with respect to whether to transmit or drop overlapping physical uplink channels. For example, UE 120 may first evaluate priority levels and second evaluate security levels. In this case, UE 120 may defer or delay any physical uplink channels with lower priority levels than a highest priority level physical uplink channel, than may defer or delay any remaining physical uplink channels with lower security levels than a remaining physical uplink channel with a highest security level. In other words, as shown, UE 120 may first defer channels C and D for having a lower priority and may then defer channel B for having a lower security level (and may transmit channel A). In contrast, in some aspects, UE 120 may first evaluate security levels and second evaluate priority levels. In this case, UE 120 may first defer channels A and B for having a lower security level and may then defer channel D for having a lower priority level (and may transmit channel C). In some aspects, UE 120 may receive, from base station 110, signaling indicating or order, weighting system, or algorithm for evaluating a security level and one or more other factors (e.g., a priority level or another factor).

In some aspects, UE 120 may select a security key to use with a physical uplink channel from a set of available security keys. For example, when UE 120 determines to drop channel C and transmit channel D, UE 120 may select a stronger security key from among security keys sk3 and sk4 to use for transmission of channel D. Additionally, or alternatively, UE 120 may select a sequentially first security key (e.g., sk3) and may defer use of a sequentially second security key (e.g., sk4) (and may defer degrading the second security key until a next use of the second security key). Additionally, or alternatively, UE 120 may select a security key corresponding to the channel for transmission (e.g., UE 120 may select sk4, defer use of sk3, and defer degradation of sk3).

Additionally, or alternatively, UE 120 may derive a composite key based at least in part on sk3 and sk4. For example, UE 120 may apply an exclusive OR (XOR) operation or a random-like selection operation (that is deterministic for base station 110) to sequences of sk3 and sk4 and derive a composite key of, for example, afgd, which UE 120 may apply a scrambling operation to (e.g., to generate a key sequence gfda). Additionally, or alternatively, UE 120 may apply a hashing operation to generate a composite key from sk3 and sk4 and may use the composite key for scrambling, in the aforementioned example, channel D. In these cases, when deriving a composite key, UE 120 may degrade both sk3 and sk4, but may use a different set of parameters (e.g., which may be defined or signaled by base station 110) for degradation (e.g., resulting in sk3 and sk4 degrading less, when used for a composite key, then when used, alone, as the security key). Additionally, or alternatively, UE 120 may use a key derivation function, where sk3 and sk4 are input to the key derivation function, to generate the key. Additional details regarding a key derivation function are described with regard to 3GPP Technical Specification (TS) 33.220 Release 17, version 17.1.0 Annex B.2.2.

In some aspects, UE 120 may alter a size of a security key. For example, when sk3 is shorter than sk4 (e.g., channel C is associated with a smaller payload size than channel D) and UE 120 determines to use sk3, UE 120 may extend sk3. In this case, UE 120 may use a key derivation function to extend sk3 with sk3 as an input to the key derivation function. Similarly, when sk3 is longer than sk4, UE 120 may contract sk3 for use. In this case, UE 120 may extend a security key (e.g., sk3) using a quantity of bits selected based at least in part on a payload size that the security key is to encode (e.g., sk3 is extended to match a payload size of channel D). In some aspects, UE 120 may generate the bits to extend sk3 based at least in part on a random-like procedure (that is deterministic for base station 110), a segmental operation (e.g., dividing sk3 into segments and then using a bit level operation to select bits from different segments as extra bits to extend to sk3), or a scrambling operation, among other examples. Additionally, or alternatively, UE 120 may contract sk3 using a hashing function, a truncation function (e.g., truncated from a beginning or end of sk3), or another function.

As further shown in FIG. 8, and by reference number 820, UE 120 may transmit one or more of the set of physical uplink channels. For example, UE 120 may transmit the first physical uplink channel communication and drop the second physical uplink channel communication based at least in part on respective security levels of the first physical uplink channel and the second physical uplink channel. In some aspects, UE 120 may encrypt a transmitted physical uplink channel using a security key. For example, UE 120 may encrypt the first physical uplink channel using a first security key associated with the first physical uplink channel, a second security key associated with the second physical uplink channel, a composite key derived from the first security key or the second security key, or another security key.

As indicated above, FIG. 8 is provided as an example. Other examples may differ from what is described with respect to FIG. 8.

Figure 9:
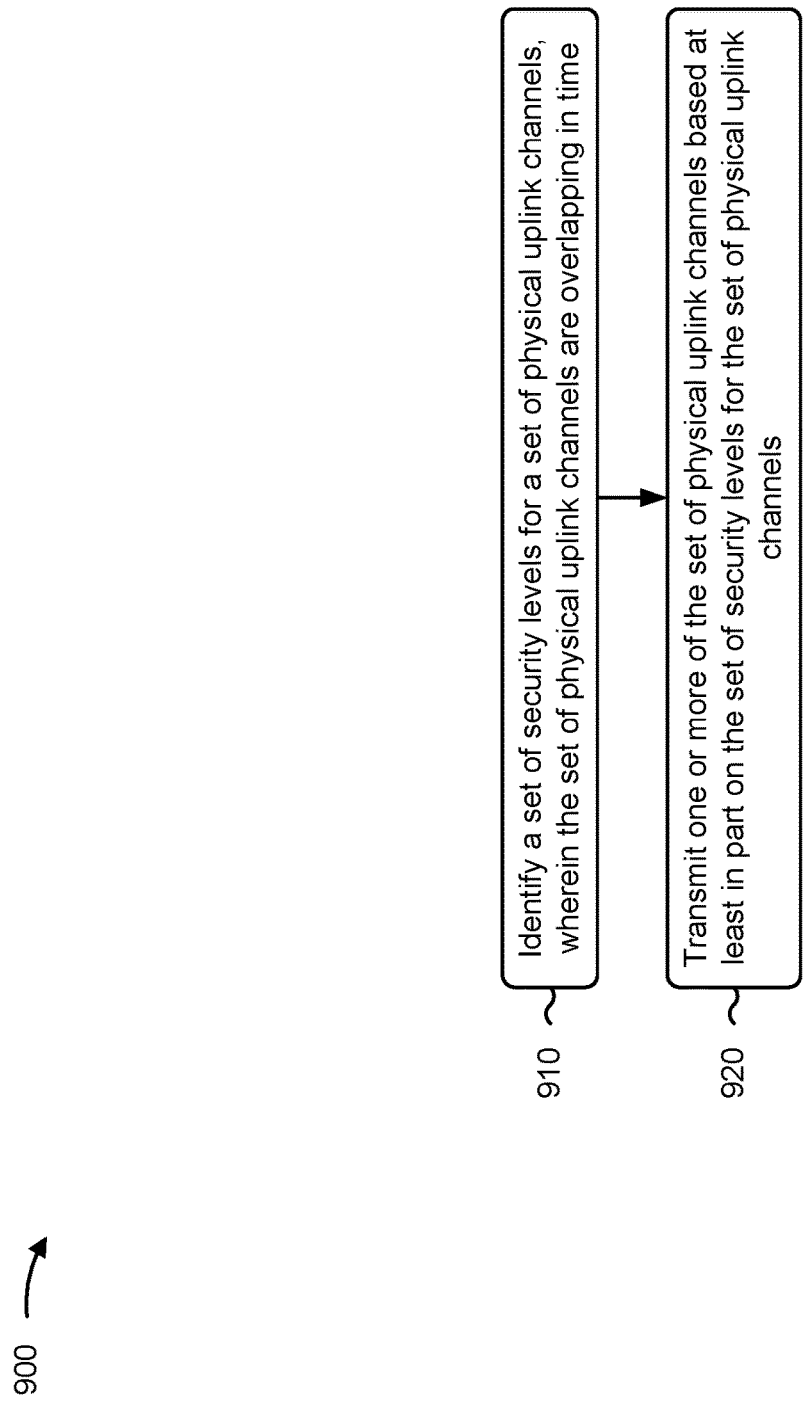
FIG. 9 is a diagram illustrating an example process associated with physical uplink channel handling based on channel security, in accordance with the present disclosure.

FIG. 9 is a diagram illustrating an example process 900 performed, for example, by a UE, in accordance with the present disclosure. Example process 900 is an example where the UE (e.g., UE 120) performs operations associated with physical uplink channel handling based on channel security.

As shown in FIG. 9, in some aspects, process 900 may include identifying a set of security levels for a set of physical uplink channels, wherein the set of physical uplink channels are overlapping in time (block 910). For example, the UE (e.g., using communication manager 140 and/or identification component 1008, depicted in FIG. 10) may identify a set of security levels for a set of physical uplink channels, wherein the set of physical uplink channels are overlapping in time, as described above.

As further shown in FIG. 9, in some aspects, process 900 may include transmitting one or more of the set of physical uplink channels based at least in part on the set of security levels for the set of physical uplink channels (block 920). For example, the UE (e.g., using communication manager 140 and/or transmission component 1004, depicted in FIG. 10) may transmit one or more of the set of physical uplink channels based at least in part on the set of security levels for the set of physical uplink channels, as described above.

Process 900 may include additional aspects, such as any single aspect or any combination of aspects described below and/or in connection with one or more other processes described elsewhere herein.

In a first aspect, process 900 includes identifying a set of channel priorities for the set of physical uplink channels, and transmitting the one or more of the set of physical uplink channels based at least in part on the set of channel priorities for the set of physical uplink channels.

In a second aspect, alone or in combination with the first aspect, the UE is configured to evaluate the set of channel priorities before evaluating the set of security levels.

In a third aspect, alone or in combination with one or more of the first and second aspects, the UE is configured to evaluate the set of security levels before evaluating the set of channel priorities.

In a fourth aspect, alone or in combination with one or more of the first through third aspects, process 900 includes receiving signaling indicating an order for evaluating the set of security levels relative to evaluating the set of channel priorities.

In a fifth aspect, alone or in combination with one or more of the first through fourth aspects, transmitting the one or more of the set of physical uplink channels comprises transmitting a first physical uplink channel of the set of physical uplink channels, and dropping a second physical uplink channel of the set of physical uplink channels.

In a sixth aspect, alone or in combination with one or more of the first through fifth aspects, process 900 includes dropping a first physical uplink channel of the set of physical uplink channels, and encrypting a second physical uplink channel, of the set of physical uplink channels, with a security key associated with the first physical uplink channel.

In a seventh aspect, alone or in combination with one or more of the first through sixth aspects, process 900 includes storing another security key associated with the second physical uplink channel for use with another physical uplink channel for transmission, and maintaining a security level of the other security key when storing the other security key.

In an eighth aspect, alone or in combination with one or more of the first through seventh aspects, process 900 includes dropping a first physical uplink channel, of the set of physical uplink channels, associated with a first security key, and encrypting a second physical uplink channel, of the set of physical uplink channels, with a second security key associated with the second physical uplink channel.

In a ninth aspect, alone or in combination with one or more of the first through eighth aspects, process 900 includes storing the first security key associated with the first physical uplink channel for use with another physical uplink channel for transmission, and maintaining a security level of the first security key when storing the first security key.

In a tenth aspect, alone or in combination with one or more of the first through ninth aspects, transmitting the one or more of the set of physical uplink channels comprises transmitting a first physical uplink channel of the set of physical uplink channels, and dropping a second physical uplink channel of the set of physical uplink channels, wherein the first physical uplink channel is encrypted with a stronger security key of a first security key associated with the first physical uplink channel and a second security key associated with the second physical uplink channel.

In an eleventh aspect, alone or in combination with one or more of the first through tenth aspects, transmitting the one or more of the set of physical uplink channels comprises transmitting a first physical uplink channel of the set of physical uplink channels, and dropping a second physical uplink channel of the set of physical uplink channels, wherein the first physical uplink channel is encrypted with a composite security key based on a first security key associated with the first physical uplink channel and a second security key associated with the second physical uplink channel.

In a twelfth aspect, alone or in combination with one or more of the first through eleventh aspects, the UE is configured to increment a degradation parameter associated with at least one of the first security key or the second security key based at least in part on encrypting the first physical uplink channel with the composite security key.

In a thirteenth aspect, alone or in combination with one or more of the first through twelfth aspects, process 900 includes altering a length of a security key associated with a first physical uplink channel, of the set of physical uplink channels, that is dropped to match a second physical uplink channel, of the set of physical uplink channels, that is transmitted, and encrypting the second physical uplink channel using the security key.

In a fourteenth aspect, alone or in combination with one or more of the first through thirteenth aspects, the security key is extended with a set of bits corresponding to a payload size for the second physical uplink channel.

In a fifteenth aspect, alone or in combination with one or more of the first through fourteenth aspects, the security key is extended with a set of bits selected from the security key.

In a sixteenth aspect, alone or in combination with one or more of the first through fifteenth aspects, the security key is contracted using a hashing function.

In a seventeenth aspect, alone or in combination with one or more of the first through sixteenth aspects, the security key is contracted to a set of bits corresponding to a payload size for the second physical uplink channel.

In an eighteenth aspect, alone or in combination with one or more of the first through seventeenth aspects, the set of security levels for the set of physical uplink channels is based at least in part on a set of values for a set of degradation parameters for a set of security keys associated with the set of physical uplink channels.

In a nineteenth aspect, alone or in combination with one or more of the first through eighteenth aspects, the set of values is based at least in part on a timer or a degradation function.

In a twentieth aspect, alone or in combination with one or more of the first through nineteenth aspects, the degradation function is associated with a quantity of communications transmitted using a security key.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
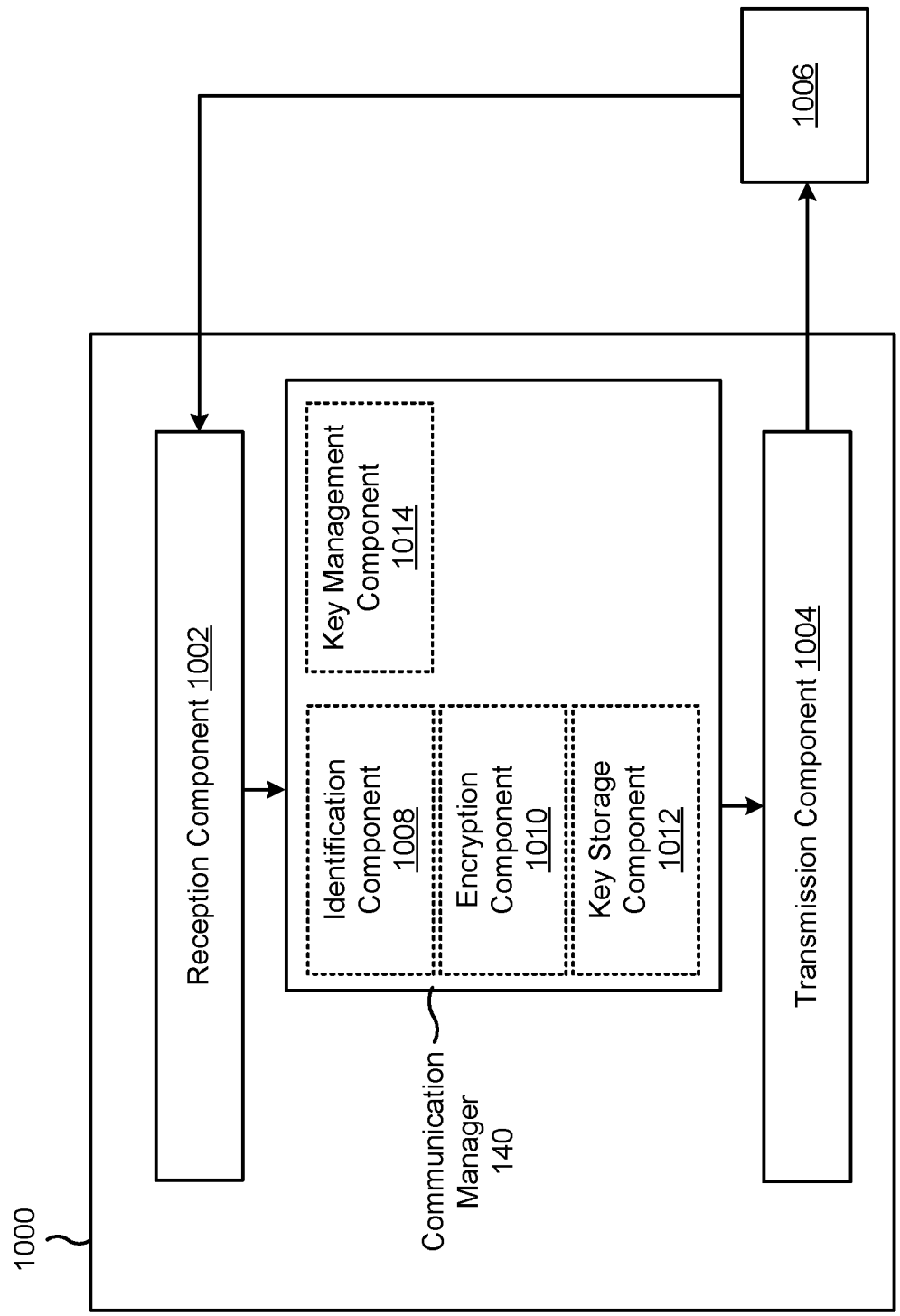
FIG. 10 is a diagram of an example apparatus for wireless communication, in accordance with the present disclosure.

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of an identification component 1008, an encryption component 1010, a key storage component 1012, or key management component 1014, among other examples.

In some aspects, the apparatus 1000 may be configured to perform one or more operations described herein in connection with FIG. 8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The identification component 1008 may identify a set of security levels for a set of physical uplink channels, wherein the set of physical uplink channels are overlapping in time. The transmission component 1004 may transmit one or more of the set of physical uplink channels based at least in part on the set of security levels for the set of physical uplink channels.

The identification component 1008 may identify a set of channel priorities for the set of physical uplink channels. The transmission component 1004 may transmit the one or more of the set of physical uplink channels based at least in part on the set of channel priorities for the set of physical uplink channels. The reception component 1002 may receive signaling indicating an order for evaluating the set of security levels relative to evaluating the set of channel priorities. The transmission component 1004 may drop a first physical uplink channel of the set of physical uplink channels. The encryption component 1010 may encrypt a second physical uplink channel, of the set of physical uplink channels, with a security key associated with the first physical uplink channel.

The key storage component 1012 may store another security key associated with the second physical uplink channel for use with another physical uplink channel for transmission. The key management component 1014 may maintain a security level of the other security key when storing the other security key. The transmission component 1004 may drop a first physical uplink channel, of the set of physical uplink channels, associated with a first security key. The encryption component 1010 may encrypt a second physical uplink channel, of the set of physical uplink channels, with a second security key associated with the second physical uplink channel.

The key storage component 1012 may store the first security key associated with the first physical uplink channel for use with another physical uplink channel for transmission. The key management component 1014 may maintain a security level of the first security key when storing the first security key. The key management component 1014 may alter a length of a security key associated with a first physical uplink channel, of the set of physical uplink channels, that is dropped to match a second physical uplink channel, of the set of physical uplink channels, that is transmitted. The encryption component 1010 may encrypt the second physical uplink channel using the security key.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: identifying a set of security levels for a set of physical uplink channels, wherein the set of physical uplink channels are overlapping in time; and transmitting one or more of the set of physical uplink channels based at least in part on the set of security levels for the set of physical uplink channels.

Aspect 2: The method of Aspect 1, further comprising: identifying a set of channel priorities for the set of physical uplink channels; and transmitting the one or more of the set of physical uplink channels based at least in part on the set of channel priorities for the set of physical uplink channels.

Aspect 3: The method of Aspect 2, wherein the UE is configured to evaluate the set of channel priorities before evaluating the set of security levels.

Aspect 4: The method of Aspect 2, wherein the UE is configured to evaluate the set of security levels before evaluating the set of channel priorities.

Aspect 5: The method of any of Aspects 2 to 4, further comprising: receiving signaling indicating an order for evaluating the set of security levels relative to evaluating the set of channel priorities.

Aspect 6: The method of any of Aspects 1 to 5, wherein transmitting the one or more of the set of physical uplink channels comprises: transmitting a first physical uplink channel of the set of physical uplink channels; and dropping a second physical uplink channel of the set of physical uplink channels.

Aspect 7: The method of any of Aspects 1 to 6, further comprising: dropping a first physical uplink channel of the set of physical uplink channels; and encrypting a second physical uplink channel, of the set of physical uplink channels, with a security key associated with the first physical uplink channel.

Aspect 8: The method of Aspect 7, further comprising: storing another security key associated with the second physical uplink channel for use with another physical uplink channel for transmission; and maintaining a security level of the other security key when storing the other security key.

Aspect 9: The method of any of Aspects 1 to 8, further comprising: dropping a first physical uplink channel, of the set of physical uplink channels, associated with a first security key; and encrypting a second physical uplink channel, of the set of physical uplink channels, with a second security key associated with the second physical uplink channel.

Aspect 10: The method of Aspect 9, further comprising: storing the first security key associated with the first physical uplink channel for use with another physical uplink channel for transmission; and maintaining a security level of the first security key when storing the first security key.

Aspect 11: The method of any of Aspects 1 to 10, wherein transmitting the one or more of the set of physical uplink channels comprises: transmitting a first physical uplink channel of the set of physical uplink channels; and dropping a second physical uplink channel of the set of physical uplink channels, wherein the first physical uplink channel is encrypted with a stronger security key of a first security key associated with the first physical uplink channel and a second security key associated with the second physical uplink channel.

Aspect 12: The method of Aspect 1, wherein transmitting the one or more of the set of physical uplink channels comprises: transmitting a first physical uplink channel of the set of physical uplink channels; and dropping a second physical uplink channel of the set of physical uplink channels, wherein the first physical uplink channel is encrypted with a composite security key based on a first security key associated with the first physical uplink channel and a second security key associated with the second physical uplink channel.

Aspect 13: The method of Aspect 12, wherein the UE is configured to increment a degradation parameter associated with at least one of the first security key or the second security key based at least in part on encrypting the first physical uplink channel with the composite security key.

Aspect 14: The method of any of Aspects 1 to 13, further comprising: altering a length of a security key associated with a first physical uplink channel, of the set of physical uplink channels, that is dropped to match a second physical uplink channel, of the set of physical uplink channels, that is transmitted; and encrypting the second physical uplink channel using the security key.

Aspect 15: The method of Aspect 14, wherein the security key is extended with a set of bits corresponding to a payload size for the second physical uplink channel.

Aspect 16: The method of Aspect 14, wherein the security key is extended with a set of bits selected from the security key.

Aspect 17: The method of Aspect 14, wherein the security key is contracted using a hashing function.

Aspect 18: The method of Aspect 14, wherein the security key is contracted to a set of bits corresponding to a payload size for the second physical uplink channel.

Aspect 19: The method of any of Aspects 1 to 18, wherein the set of security levels for the set of physical uplink channels is based at least in part on a set of values for a set of degradation parameters for a set of security keys associated with the set of physical uplink channels.

Aspect 20: The method of Aspect 19, wherein the set of values is based at least in part on a timer or a degradation function.

Aspect 21: The method of Aspect 20, wherein the degradation function is associated with a quantity of communications transmitted using a security key.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
identify a set of security levels and a set of channel priorities for a set of uplink channels, wherein the set of uplink channels comprises a plurality of uplink channel communications overlapping in time; and
transmit one or more uplink channels of the set of uplink channels based at least in part on the set of security levels and the set of channel priorities, wherein the one or more uplink channels include at least one uplink channel communication comprising a higher security level or a higher priority level relative to at least one other uplink channel communication of the plurality of uplink channel communications, wherein the one or more processors, to transmit the one or more uplink channels, are configured to:
transmit a first uplink channel of the set of uplink channels, the first uplink channel comprising a first security level of the set of security levels and a first channel priority of the set of channel priorities, wherein the first security level is based at least in part on a first security key corresponding to the first uplink channel; and
drop, based at least in part on the set of security levels and the set of channel priorities, a second uplink channel of the set of uplink channels, the second uplink channel comprising a second security level distinct from the first security level and a second channel priority distinct from the first channel priority.

2. The UE of claim 1, wherein the UE is configured to evaluate the set of channel priorities before evaluating the set of security levels.

3. The UE of claim 1, wherein the UE is configured to evaluate the set of security levels before evaluating the set of channel priorities.

4. The UE of claim 2, wherein the one or more processors are further configured to:
receive signaling indicating an order for evaluating the set of security levels relative to evaluating the set of channel priorities.

5. The UE of claim 1, wherein the one or more processors are further configured to:
encrypt the first uplink channel with a second security key associated with the second uplink channel.

6. The UE of claim 5, wherein the one or more processors are further configured to:
store the second security key for use with another uplink channel for transmission; and
maintain a security level of the second security key when storing the second security key.

7. The UE of claim 1, wherein the one or more processors are further configured to:
encrypt the first uplink channel with the first security key.

8. The UE of claim 1, wherein the one or more processors are further configured to:
store the first security key for use with another uplink channel for transmission; and
maintain a security level of the first security key when storing the first security key.

9. The UE of claim 1, wherein the first uplink channel is encrypted with a stronger security key of the first security key and a second security key associated with the second uplink channel.

10. The UE of claim 1, wherein the first uplink channel is encrypted with a composite security key based at least in part on the first security key and a second security key associated with the second uplink channel.

11. The UE of claim 10, wherein the UE is configured to increment a degradation parameter associated with at least one of the first security key or the second security key based at least in part on encrypting the first uplink channel with the composite security key.

12. The UE of claim 1, wherein the one or more processors are further configured to:
alter a length of the first security key to match a length of a third security key associated with a third uplink channel of the set of uplink channels; and
encrypt the third uplink channel using the first security key.

13. The UE of claim 12, wherein the first security key is extended with a set of bits corresponding to a payload size for the third uplink channel.

14. The UE of claim 12, wherein the first security key is extended with a set of bits selected from the first security key.

15. The UE of claim 12, wherein the first security key is contracted using a hashing function.

16. The UE of claim 12, wherein the first security key is contracted to a set of bits corresponding to a payload size for the third uplink channel.

17. The UE of claim 1, wherein the set of security levels for the set of uplink channels is based at least in part on a set of values for a set of degradation parameters for a set of security keys associated with the set of uplink channels, the set of security keys including the first security key.

18. The UE of claim 17, wherein the set of values is based at least in part on a timer or a degradation function.

19. The UE of claim 18, wherein the degradation function is associated with a quantity of communications transmitted using the first security key.

20. A method of wireless communication performed by a user equipment (UE), comprising:
identifying a set of security levels and a set of channel priorities for a set of uplink channels, wherein the set of uplink channels comprises a plurality of uplink channel communications overlapping in time; and
transmitting one or more uplink channels of the set of uplink channels based at least in part on the set of security levels and the set of channel priorities, wherein the one or more uplink channels include at least one uplink channel communication comprising a higher security level or a higher priority level relative to at least one other uplink channel communication of the plurality of uplink channel communications, wherein transmitting the one or more uplink channels comprises:
transmitting a first uplink channel of the set of uplink channels, the first uplink channel comprising a first security level of the set of security levels and a first channel priority of the set of channel priorities, wherein the first security level is based at least in part on a first security key corresponding to the first uplink channel; and
dropping, based at least in part on the set of security levels and the set of channel priorities, a second uplink channel of the set of uplink channels, the second uplink channel comprising a second security level distinct from the first security level and a second channel priority distinct from the first channel priority.

21. The method of claim 20, comprising evaluating the set of channel priorities before evaluating the set of security levels.

22. The method of claim 20, comprising evaluating the set of security levels before evaluating the set of channel priorities.

23. The method of claim 20, further comprising:
receiving signaling indicating an order for evaluating the set of security levels relative to evaluating the set of channel priorities.

24. The method of claim 20, further comprising:
encrypting the first uplink channel with a second security key associated with the second uplink channel.

25. A non-transitory computer-readable medium storing a set of instructions for wireless communication, the set of instructions comprising:
one or more instructions that, when executed by one or more processors of a user equipment (UE), cause the UE to:
identify a set of security levels and a set of channel priorities for a set of uplink channels, wherein the set of uplink channels comprises a plurality of uplink channel communications overlapping in time; and
transmit one or more uplink channels of the set of uplink channels based at least in part on the set of security levels and the set of channel priorities, wherein the one or more uplink channels include at least one uplink channel communication comprising a higher security level or a higher priority level relative to at least one other uplink channel communication of the plurality of uplink channel communications, wherein the one or more instructions, when executed by the one or more processors to transmit the one or more uplink channels, cause the UE to:
transmit a first uplink channel of the set of uplink channels, the first uplink channel comprising a first security level of the set of security levels and a first channel priority of the set of channel priorities, wherein the first security level is based at least in part on a first security key corresponding to the first uplink channel; and
drop, based at least in part on the set of security levels and the set of channel priorities, a second uplink channel of the set of uplink channels, the second uplink channel comprising a second security level distinct from the first.

26. An apparatus for wireless communication, comprising:
means for identifying a set of security levels and a set of channel priorities for a set of uplink channels, wherein the set of uplink channels comprises a plurality of uplink channel communications overlapping in time; and
means for transmitting one or more uplink channels of the set of uplink channels based at least in part on the set of security levels and the set of channel priorities, wherein the one or more uplink channels include at least one uplink channel communication comprising a higher security level or a higher priority level relative to at least one other uplink channel communication of the plurality of uplink channel communications, wherein the means for transmitting the one or more uplink channels comprise:
means for transmitting a first uplink channel of the set of uplink channels, the first uplink channel comprising a first security level of the set of security levels and a first channel priority of the set of channel priorities, wherein the first security level is based at least in part on a first security key corresponding to the first uplink channel; and
means for dropping, based at least in part on the set of security levels and the set of channel priorities, a second uplink channel of the set of uplink channels, the second uplink channel comprising a second security level distinct from the first security level and a second channel priority distinct from the first channel priority.

27. The non-transitory computer-readable medium of claim 25, wherein the one or more instructions, when executed by the one or more processors, further cause the UE:
evaluate the set of security levels before evaluating the set of channel priorities.

28. The apparatus of claim 26, wherein the apparatus is configured to evaluate the set of security levels before evaluating the set of channel priorities.

29. The non-transitory computer-readable medium of claim 25, wherein the one or more instructions, when executed by the one or more processors, further cause the UE:
    receive signaling indicating an order for evaluating the set of security levels relative to evaluating the set of channel priorities.

30. The apparatus of claim 26, further comprising:
means for receiving signaling indicating an order for evaluating the set of security levels relative to evaluating the set of channel priorities.

\* \* \* \* \*